United States Patent
Sood

(10) Patent No.: US 8,302,183 B2
(45) Date of Patent: Oct. 30, 2012

(54) APPARATUS AND METHOD OF SECURITY IDENTITY CHECKER

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 12/337,870

(22) Filed: Dec. 18, 2008

(65) Prior Publication Data

US 2010/0161980 A1 Jun. 24, 2010

(51) Int. Cl.
*H04L 29/06* (2006.01)
*G06F 7/04* (2006.01)
*G06F 17/30* (2006.01)
*G06F 12/00* (2006.01)
*G06F 12/14* (2006.01)
*G06F 13/00* (2006.01)

(52) U.S. Cl. ....... 726/17; 726/2; 726/3; 726/4; 713/156; 713/186; 713/189

(58) Field of Classification Search .................. None
See application file for complete search history.

(56) References Cited

U.S. PATENT DOCUMENTS

| | | | | |
|---|---|---|---|---|
| 8,015,592 | B2 * | 9/2011 | Doughty et al. ................... | 726/2 |
| 2002/0104031 | A1 * | 8/2002 | Tomlinson et al. ............ | 713/320 |
| 2003/0179725 | A1 * | 9/2003 | Lo et al. ........................ | 370/328 |
| 2004/0073818 | A1 * | 4/2004 | Cheok et al. .................... | 713/300 |
| 2007/0079161 | A1 * | 4/2007 | Gupta ............................. | 713/324 |
| 2007/0082716 | A1 * | 4/2007 | Behzad et al. ................. | 455/574 |
| 2007/0156858 | A1 | 7/2007 | Sood et al. | |
| 2007/0198848 | A1 * | 8/2007 | Bjorn ............................. | 713/186 |
| 2008/0320492 | A1 * | 12/2008 | James et al. ................... | 719/314 |
| 2009/0031147 | A1 * | 1/2009 | Horvat ........................... | 713/300 |
| 2009/0073481 | A1 * | 3/2009 | Ferlitsch et al. .............. | 358/1.14 |
| 2009/0181713 | A1 * | 7/2009 | Lee et al. ....................... | 455/522 |
| 2009/0210519 | A1 * | 8/2009 | Zill et al. ....................... | 709/220 |
| 2011/0051638 | A1 * | 3/2011 | Jeon et al. ...................... | 370/311 |
| 2011/0194471 | A1 * | 8/2011 | Kim et al. ...................... | 370/311 |

OTHER PUBLICATIONS

U.S. Appl. No. 10/864,688, filed Sep. 28, 2007, Sood et al.

\* cited by examiner

*Primary Examiner* — Shin-Hon Chen
(74) *Attorney, Agent, or Firm* — Cool Patent, P.C.; Kenneth J. Cool

(57) ABSTRACT

A method and apparatus that establish secure communications between two stations. The apparatus includes a low power communication processor and a host processor in a sleep mode. The low power communication processor receives a protocol message to initiate a communication. The protocol message includes an encrypted cryptographic identity token and triggers a wake-up event in order to wake up the host processor according to a result of identity a freshness checks performed by the low power communication processor.

21 Claims, 2 Drawing Sheets

APPARATUS AND METHOD OF SECURITY IDENTITY CHECKER

BACKGROUND OF THE INVENTION

In a distributed system environment (e.g. large multi-core processor), a host Central processing unit (CPU), Bridges, Memory may go to sleep, while the low-power Wireless/Wired Adapter may process incoming packet streams. Specifically, a wireless communication processor and/or wired communication processor may trigger Wake-on-Event and Wake-on-packet-type after receiving and processing the incoming stream in order to wake up the host processor and the other processing platform components, if desired.

The wireless communication processor and/or the wired communication processor are currently unprotected, and as such, open the processing platform to multiple attacks. Unprotected packets are processed by the communication core on ""good faith"" by a WakeOn engine in the communication core. One instance of an attack is that the processing platform components are denied going into an extended sleep modes, causing unnecessary power drain, and negative user experience for example, lower battery life. Others are more serious in that the platform is now open to additional denial-of-service (DoS) attack and invasive attacks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
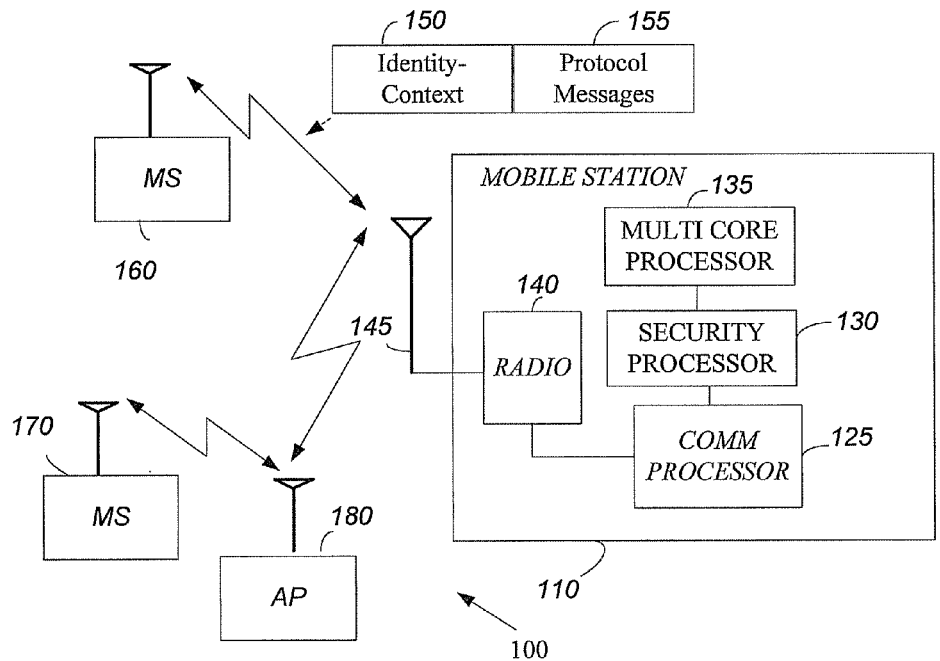
FIG. 1 is an illustration of a portion of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as ""processing,"" ""computing,"" ""calculating,"" ""determining,"" or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term ""plurality"" may be used throughout the specification to describe two or more components, devices, elements, parameters and the like. For example, ""plurality of mobile stations"" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN) which also may be referred as WiFi, wireless metropolitan area network (WMAN) which also may be referred as WiMAX, a wireless personal area network (WPAN) such as, for example Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which"

partially mention above, and the invention is in no way limited to the above mentioned signals.

Turning first to FIG. 1, an illustration of a portion of a wireless communication system 100 according to an exemplary embodiment of the present invention is shown. According to this exemplary embodiment of the invention, wireless communication system 100 includes a mobile station (MS) 110, a mobile station (MS) 160, a mobile station (MS) 170 and an access point (AP) 180. According to one example, MS 110 may include a communication (comm.) processor 125, a security processor 130, a multi-core processor 135, a radio 140 for example, a WiFi radio, and an antenna 145. Although the scope of the present invention is not limited in this respect, antenna 145 may include a dipole antenna, an omni-directional antenna, an internal antenna, a Yagi antenna, or the like.

According to exemplary embodiments of the invention, MS 110 may communicate directly with MS 160 and may communicate with AP 170. Furthermore, according to one example embodiment, MS 110 and 160 may include identity—capable platforms which may establish globally distinct identities known to MS 110 and MS 160 and may run an application for example, Transport Control Protocol/Internet Protocol (TCP/IP) based application. MS 110 and MS 160 may operate in a power saving mode and may wake up upon receiving one or more protocol messages, if desired.

According to some exemplary embodiments of the invention, both MS 110 and MS 160 may include communication processor 125 to receive the protocol message, security processor 130 to verify the freshness and the identity of the sending station of the received protocol message. Communication processor 125 may wake-up multi-core processor 135 after verifying freshness of the message and identity of the sending station. For example, communication processor 125 may be a low power processor that able to maintain continual secure network presence e.g., wireless network interface card (WNIC) and/or active management technology/Manageability Engine (AMT/ME) or the like.

For example, in order to establish communication between MS 110 and MS 160. MS 160 may wake up and formulate a desired protocol message 155. MS 160 may add an encrypted cryptographic freshness identity token to first message of the protocol (e.g., an "Identity-Context" message 150). Communication processor 125 of MS 110 may receive the message and security processor 130 or a security module of the communication processor 125 may check the identity and freshness of the token. If both identity check and freshness check passed, then communication processor 125 may trigger a wake up event in order to wake-up multi-core processor 135 from a sleep mode, although it should be understood that the present invention is not limited to this exemplary embodiment.

Although the scope of the present invention is not limited in this respect, "Identity-Context" message 150 which may include an encrypted cryptographic freshness identity token may be added to standard network protocols. For example, existing network protocols may be extended by an "Identity-Context" field along with the traditional fields that accompany those protocols. For instance, this "Identity-Context" message 150 may be added to: TCP SYN message which is the first message of the TCP protocol, an IP header, an 802.11/.16 beacon, a SIP Invite message and the like.

Although the scope of the present invention is not limited in this respect, "Identity-Context" message 150 according to embodiments of the invention, may have the following cryptographic primitives applied:

1) Identity-Tuple contains the Identity and a liveness counter.

2) The Identity-Context is encrypted with a cipher (e.g., Advanced Encryption Standard (AES)) for data confidentiality.

3) A spoofing device may not decipher the Identity-Context communicated in the network protocol.

4) An encrypted counter (e.g. RNG, protocol counter) may be appended to the Identity-Context message 150.

5) The Identity-Context message 150 may be authenticated with a Media Access Control address (MAC) primitive such as, for example SHA256.

6) Keys $KEK_{AB}$ and $KCK_{AB}$ (not shown) may derived and exchanged at the secure bootstrap time. Key management is performed within an Identity-Capable Module, and keys secure may delivered to the communication processor for processing.

According to embodiments of the invention, MS 110 and 160 may perform an out of band initial exchange of identities via a trusted channel, if desired. This may be done by extending the WiFi Alliance standard (e.g., IEEE 802.11 standard family), Wireless Protected setup, or by using a Diffie-Hellman-based exchange protocol. The above mentioned protocols may be applicable to network interfaces, for example, IEEE 802.16, IEEE 802.3, 3G/LTE or the like. Diffie-Hellman key exchange (D-H) is a cryptographic protocol that allows two parties that have no prior knowledge of each other to jointly establish a shared secret key over an insecure communications channel. This key may then be used to encrypt subsequent communications using a symmetric key cipher. Furthermore, this protocol extends emerging standards like Trusted Computing Group/Trusted Platform Module (TCG/TPM) and IEEE 802.3AR (Device Identity) to create a new usage for power management, if desired.

According to some embodiment of the invention, security processor 130 may process for example, encrypt and/or decrypt the protocol messages, if desired. For example, security processor 130 may encrypt and/or decrypt identity context message 150 and/or protocol messages of IEEE 802.16, IEEE 802.3, 3G/LTE, TCP/IP, SIP or the like.

Figure 2:
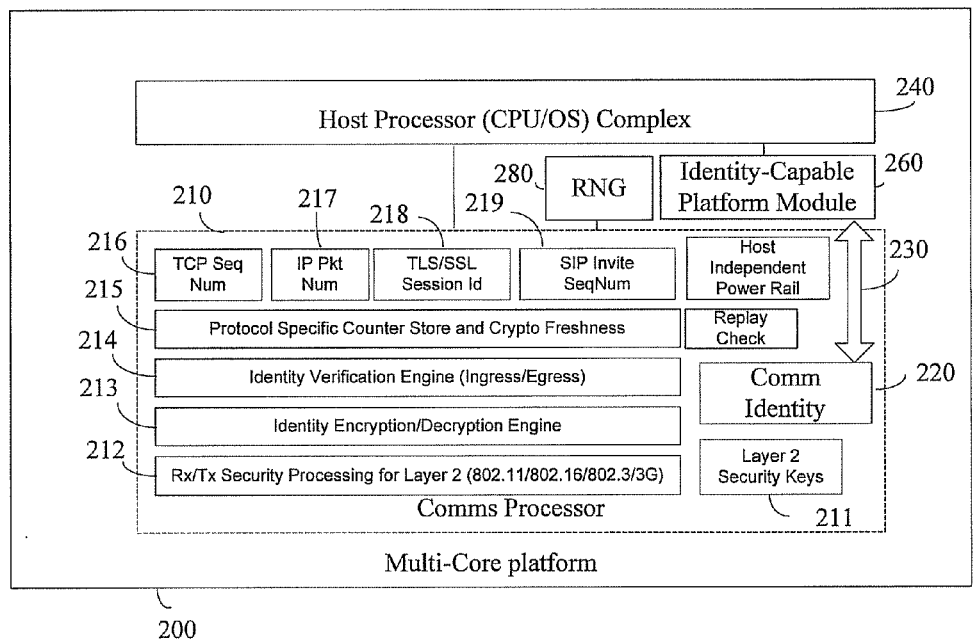
FIG. 2 is a block diagram of a multi-core platform according to some exemplary embodiments of the invention.

Turning to FIG. 2, a block diagram illustrating a multi-core platform 200 according to some exemplary embodiments of the invention is shown. According to this example, multi-core platform 200 may include a communication processor 210, a communication identity module 220, a trusted channel 230, a host processor 240, an identity-capable platform module 260 and a random number generator (RNG) 280. According to this example, communication processor 210 may include a WNIC. The WINIC 210 may include a layer 2 security keys 211, an Rx/Tx security processing module 212, an identity encryption/description engine 213, an identity verification engine 214, a protocol and freshness counters 215, a TCP sequence number 216, an IP packet number 217, a Transport Layer Security Session/Secure Socket Layer (TLS/SSL) session identification (ID) 218 and a Session Initiation Protocol (SIP) invite sequence number 219, although it should be understood that the present invention is not limited to this example.

According to this exemplary embodiment of the invention, communication processor 210 (e.g., WNIC) may process an "Identity-Context" message (e.g., Identity-Context message 150) with a desired communication protocol (e.g., IEEE 802.11n). Communication processor 210 may wake up host processor 240 only after verifying the identity and the freshness of the Identity-Context message, if desired.

For example, RNG 280 may generate a fresh token which may be a random number which may be used to depict the multi-core platform 200 identity. Identity-capable module 260 may securely generate a platform identity from this token and an "Identity-Context" massage, if desired. Furthermore, Identity-capable module 260 may exchange the "Identity-Context" massage with other trusted mobile stations over trust channel 230, if desired. When receiving the Identity-Context" message, protocol and freshness counters module 215 may keep track of network protocol counters used for enforcing security protocol freshness. For example, the WNIC may keep track of TCP Seq Num 216, SIP Invite Seq Num 219, TLS/SSI Session ID 218, etc.

In one embodiment of the present invention, communications processor 210 (e.g., WNIC) may perform identity verification of all incoming Wake-On packets using trusted channel 230 and Identity-capable module 260, if desired. According to this example, the WNIC may not wake-up the identity-capable platform module 260 unless necessary. The Identity security processing may be performed on the low-power communication core (e.g. WNIC 210) at any time.

Rx/Tx security processing module 212 may perform security processing (IEEE 802.11i, IEEE 802.16e, etc.) for link and network level protocols up to the level for which the Identity is being processed. Specifically, on receiving an encrypted IEEE 802.11 stack, identity Encryption/Decryption engine 213 may perform IEEE 802.11 security processing before the SIP-Invite message is verified for identity, although the scope of the present invention is not limited in this respect.

Furthermore, Identity encryption/Decryption engine 213 may encrypt and/or decrypt the message and may provide message authentication security processing for the Identity-Context message, if desired. Identity verification engine 214 may verify the identity by ensuring that the incoming identity on a protocol message matches the identity of multi-core platform 200 and by ensuring that the counter that counts the incoming protocol messages is greater than the previous count of the counter that count the previous received protocol messages. This may protect against replay attacks and may prevent potential attacker not to re-use an already used Identity-Context. Protocol and freshness counters module 215 may provide a different counter for each peer client, if desired. The peer (remote) client identity may be included in the Identity-Context message, and may be checked with upper-layer security bindings, if desired.

Figure 3:
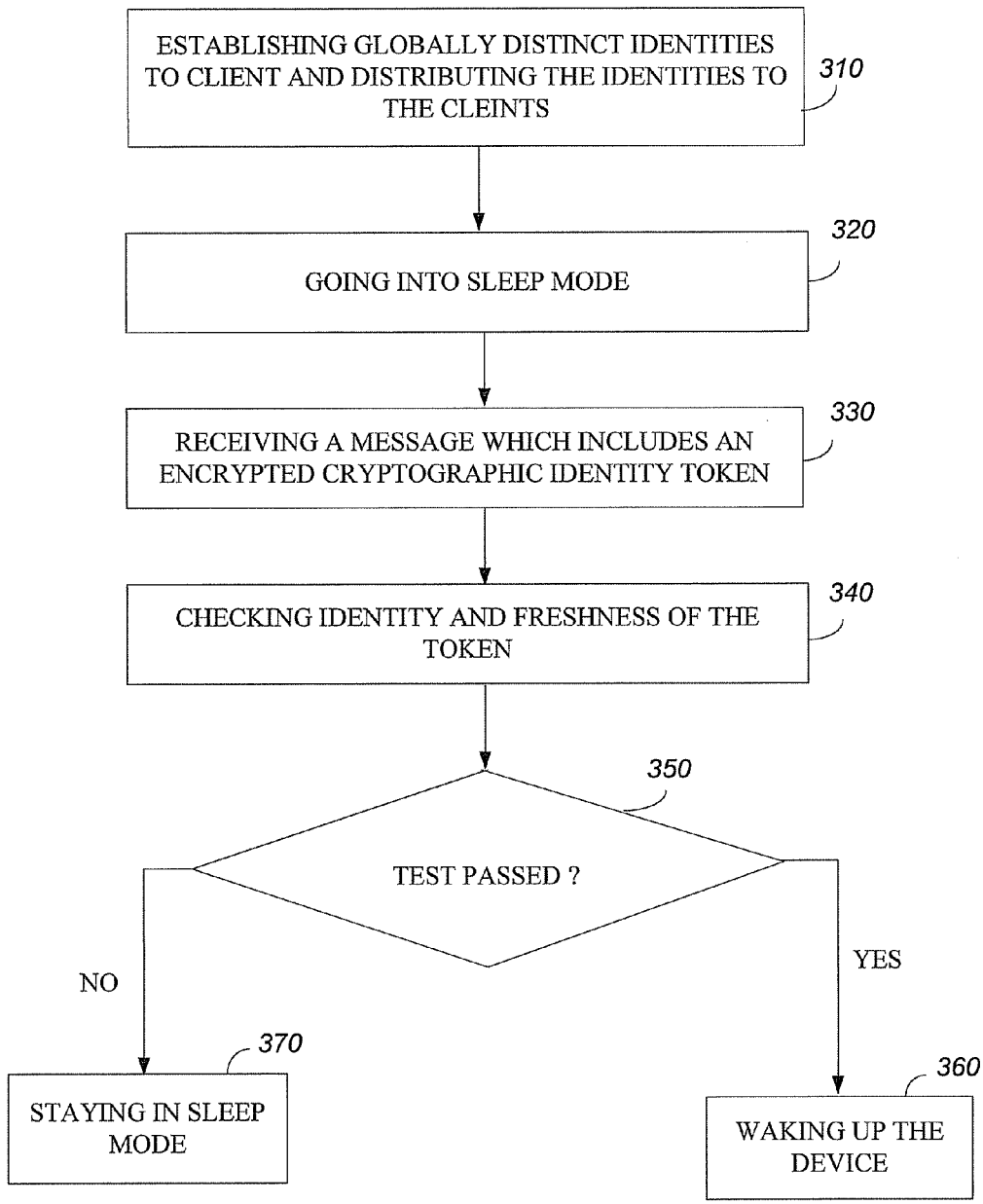
FIG. 3 is a flow chart diagram of a method of secured communication between stations, according to some embodiments of the invention.

Turning to FIG. 3, a flow chart diagram of a method of secured communication between stations, according to some embodiments of the invention is shown. The method may start with establishing globally distinct identities to a first client (e.g., a wireless mobile station) and distributing the identities to other clients (e.g., other wireless mobile stations) that the first client wishes to communicate with (text box 310). The client may go and/or be at a sleep mode (text box 320). According to some embodiments of the invention, the client may include a host processor (e.g., host processor 240) and a low power communication processor (e.g., communication processor 210. According to some embodiments of the invention, the host processor is in sleep mode while the low power processor is able to receive a protocol message that includes an encrypted cryptographic identity token and/or "Identity-Context" message (text box 330). The low power communication processor and/or the security processor (e.g., security processor 130) may check the identity and the freshness of the token (text box 340) by comparing them to a local token value and a counter value, if desired. If the test passed (diamond 350) the low power communication processor may trigger a wake up event to the host processor in order to wake up the client (e.g., MS 160) (text box 360). If the test failed the client (e.g., MS 160) may remain in a sleep mode (text box 370), although the scope of the present invention is not limited in this respect.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   establishing an identity exchange via a network with a remote device to generate an identity context message that includes an encrypted cryptographic freshness identity token;
   placing a host processor into a sleep mode while maintaining presence on the network with a communication processor;
   while operating the host processor in a sleep mode, receiving from a sending device a protocol message with the communication processor to initiate a communication, wherein the protocol message includes the identity context message;
   checking identity and freshness of the protocol massage based at least in part on the identity context message, wherein checking a freshness of the protocol massage comprises comparing a value of an incoming protocol message a counter with a received protocol messages counter; and
   waking up the host processor if the identity and freshness check of the protocol message is passed.

2. The method of claim 1, wherein said establishing comprises generating and encrypting a random number to be used as an encrypted counter value for the identity context message.

3. The method of claim 1, wherein the protocol message comprises an existing network protocol message and the identity context message is contained in an Identity Context field added to the protocol message.

4. The method of claim 1, wherein said checking identity comprises determining if the sending station is the remote device of the identity exchange.

5. The method of claim 1, wherein said checking freshness comprises determining if the identity context message is not an already used identity context message.

6. The method of claim 1, wherein said checking is executed by a security processor or by a security module of the communication processor.

7. The method of claim 1, further comprising generating a different identity message for different remote devices.

8. An apparatus, comprising:
   a host processor; and
   a communication processor coupled with the host processor, wherein the communication processor is configured to:
   establish an identity exchange via a network with a remote device to generate an identity context message that includes an encrypted cryptographic freshness identity token, wherein the communication processor is further configured to check a freshness of the protocol massage by comparing a value of an incoming protocol message a counter with a received protocol messages counter;
   maintain a presence on the network while the host processor is in a sleep mode;

receiving from a sending device a protocol message to initiate a communication, wherein the protocol message includes the identity context message;

check identity and freshness of the protocol massage based at least in part on the identity context message; and wake up the host processor if the identity and freshness check of the protocol message is passed.

9. The apparatus of claim 8, wherein the communication processor is further configured to establish the identity exchange by generating and encrypting a random number to be used as an encrypted counter value for the identity context message.

10. The apparatus of claim 8, wherein the protocol message comprises an existing network protocol message and the identity context message is contained in an Identity Context field added to the protocol message.

11. The apparatus of claim 8, wherein the communication processor is further configured to check identity by determining if the sending station is the remote device of the identity exchange.

12. The apparatus of claim 8, wherein the communication processor is further configured to check freshness by determining if the identity context message is not an already used identity context message.

13. The apparatus of claim 8, further comprising a security processor to perform said checking.

14. The apparatus of claim 8, wherein the communication processor is further configured to generate a different identity message for different remote devices.

15. An article of manufacture comprising a non-transitory machine readable medium having instructions stored thereon that, if executed, result in:

establishing an identity exchange via a network with a remote device to generate an identity context message that includes an encrypted cryptographic freshness identity token;

placing a host processor into a sleep mode while maintaining presence on the network with a communication processor;

while operating the host processor in a sleep mode, receiving from a sending device a protocol message with the communication processor to initiate a communication, wherein the protocol message includes the identity context message;

checking identity and freshness of the protocol massage based at least in part on the identity context message, wherein checking a freshness of the protocol massage comprises comparing a value of an incoming protocol message a counter with a received protocol messages counter; and waking up the host processor if the identity and freshness check of the protocol message is passed.

16. The article of manufacture of claim 15, wherein said establishing comprises generating and encrypting a random number to be used as an encrypted counter value for the identity context message.

17. The article of manufacture of claim 15, wherein the protocol message comprises an existing network protocol message and the identity context message is contained in an Identity Context field added to the protocol message.

18. The article of manufacture of claim 15, wherein said checking identity comprises determining if the sending station is the remote device of the identity exchange.

19. The article of manufacture of claim 15, wherein said checking freshness comprises determining if the identity context message is not an already used identity context message.

20. The article of manufacture of claim 15, wherein said checking is executed by a security processor or by a security module of the communication processor.

21. The article of manufacture of claim 15, further comprising generating a different identity message for different remote devices.

* * * * *

UNITED STATES PATENT AND TRADEMARK OFFICE
CERTIFICATE OF CORRECTION

PATENT NO. : 8,302,183 B2  Page 1 of 1
APPLICATION NO. : 12/337870
DATED : October 30, 2012
INVENTOR(S) : Kapil Sood It is certified that error appears in the above-identified patent and that said Letters Patent is hereby corrected as shown below:

On sheet 2 of 2, in Figure 3, Box 310, line 3, delete "CLEINTS" and insert --CLIENTS--, therefor.

Signed and Sealed this
Fifth Day of February, 2013

Teresa Stanek Rea
*Acting Director of the United States Patent and Trademark Office*